Dec. 14, 1965   J. L. HARNED   3,222,944
DRIVE TRANSFER MECHANISM
Filed Sept. 14, 1961

INVENTOR.
John L. Harned
BY
Hugh L. Fisher
ATTORNEY

United States Patent Office 3,222,944
Patented Dec. 14, 1965

3,222,944
DRIVE TRANSFER MECHANISM
John L. Harned, Detroit, Mich., assignor to General Motors Corporation, Detroit, Mich., a corporation of Delaware
Filed Sept. 14, 1961, Ser. No. 138,106
9 Claims. (Cl. 74—190.5)

This invention relates generally to drive transfer mechanisms and particularly to those mechanisms incorporating friction drives for altering the drive ratio.

In so-called toric drives, power is transferred between coaxial torus disks by one or more rollers. The ratio at which the power is transferred is determined by the tilt of the rollers. In other words, the proportion between the radial distances to each of the contact points between the roller and the respective torus disks will determine the drive ratio. Because the direct tilting of the roller requires considerable effort, it is proposed by the invention to steer the roller, i.e., induce an inclination of the roller so that the roller will precess or steer itself to the desired tilt position.

Also, if it is desired to control the speed of the toric drive over a substantial range, or even to maintain a relatively constant speed of one of the torus disks, stability and responsiveness become significant factors. Accordingly, the invention contemplates a novel electrical provision for causing the position of the roller to be altered so that the speed varies according to a predetermined scheme. The invention further contemplates a unique control system that detects variations in the speed of one of the torus disks from some desired speed and causes a corresponding error signal to be applied to an electromagnetic device that in turn makes the necessary corrections in the roller tilt position.

In a toric drive, a centering spring is usually required to return the rollers to a neutral position once the inclining force is removed. But, by the invention, the need for the centering spring, which often induces unwanted errors into a system, is eliminated due to the novel way in which the control system and the positioning of the rollers is accomplished.

The foregoing and other objects and advantages of the invention will be apparent from the following description and the accompanying drawings in which.

Figure 1:
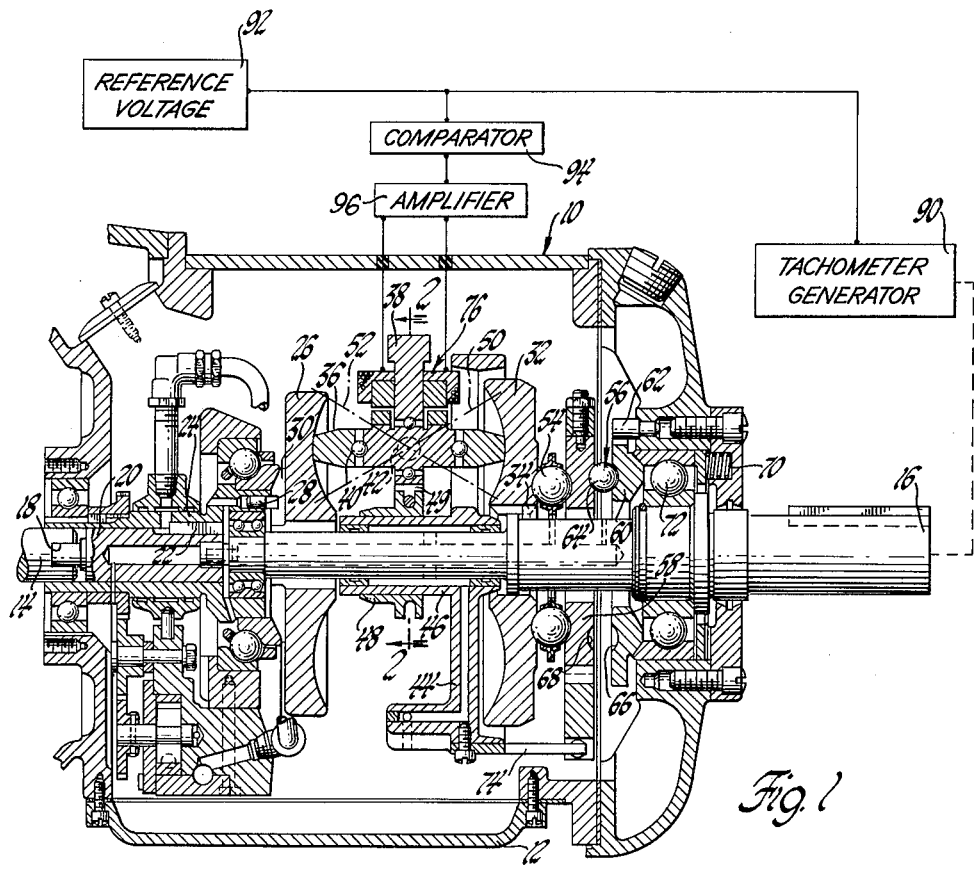
FIGURE 1 is a combined sectional view of the variable speed mechanism and a block diagram of the control system for the mechanism, each incorporating the principles of the invention.

Referring to the drawings in detail, and particularly to FIGURE 1, the drive transfer mechanism has been assigned the numeral 10 and may be of the kind disclosed in the Murden Patent 2,132,751. In view of this prior detailed disclosure, the mechanism 10 will only be described here in sufficient detail to facilitate an understanding of the invention. The mechanism 10 includes a casing 12 in which are journaled coaxial input and output shafts 14 and 16 connected respectively to a power source and a load in any appropriate way. The input shaft 14 is slotted at 18 so as to receive the end of an intermediate shaft 20. The intermediate shaft 20 is drive connected by means of a key 22 to a sleeve shaft 24 from which drive is transferred to a driving torus disk 26. This latter drive connection between the sleeve shaft 24 and the driving torus disk 26 may be accomplished in any appropriate way such as by a drive dowel 28. The drive dowel 28 is carried by the sleeve shaft 24 and engages a notch 30 formed in the face of the driving torus disk 26. The output shaft 16 is connected to a driven torus disk 32 in any suitable way, e.g., by a key 34.

Figures 2, 3:
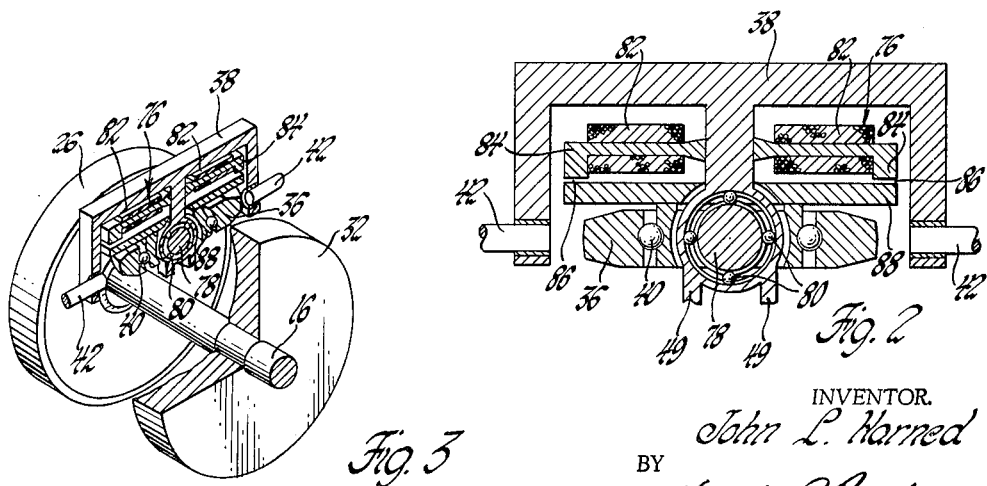
FIGURE 2 is a sectional view of one of the rollers and the carrier therefor taken along line 2—2 of FIGURE 1.
FIGURE 3 is a perspective view of the mechanism.

Drive is transferred between the torus disks 26 and 32 by one or more rollers 36. In this embodiment preferably three equally spaced rollers 36 are employed and are supported on individual carriers 38 by bearings 40. Each carrier 38 as best shown in FIGURE 2 has shaft ends 42 revolvably supported by a spider 44. Rotation of the individual carriers 38 on the spider 44 takes place about a so-called tilt axis. The carriers 38 are each further supported on a hub portion 46 of the spider 44. This hub portion 46 is journaled on the output shaft 16 and has a sleeve 48 slidable thereon. The sleeve 48 serves as a slidable support for depending arms 49 on the carriers 38.

When the rollers 36 are rocked or tilted about the tilt axis defined by the shaft ends 42 (see FIGURE 3), the drive ratio between the driving and driven disks 26 and 32 is changed in a known way. For example, if the rollers 36 are moved to the broken line position denoted by the numeral 50 in FIGURE 1, then the mechanism 10 is conditioned for the low speed ratio and high torque drive, i.e., the driven torus disk 32 will be revolving at a slower speed than the driving torus disk 26. On the other hand, if the rollers 36 are tilted to a position designated by a broken line 52, the mechanism is prepared to provide a high speed ratio whereas with the rollers 36 in the FIGURE 1 illustrated position, a direct drive is achieved.

It is essential during operation that the rollers 36 be maintained in frictional contact with the driving and driven disks 26 and 32 by a force adequate to prevent slippage. This is accomplished by inducing an axial force that reflects the load on the output shaft 16. This axial force is transferred through a thrust bearing 54 to the driven torus disks 32 by a loading device 56 of the ball ramp type. The device 56 includes a rotatable ring 58, which also serves as a race on the thrust bearing 54, and a non-rotatable ring 60 grounded at 62 to the casing 12. In between the two rings 58 and 60 are one or more balls 64 positioned within cam grooves 66 and 68 respectively in the rings 60 and 58. These cam grooves 66 and 68 are of variable depth as portrayed in FIGURE 1. The energizing force on the loading device 56 is provided by one or more energizing springs 70, the springs 70 acting through a bearing 72 to urge the rings 58 and 60 leftwardly as viewed in FIGURE 1 so as to apply an initial axial force to the driven torus disk 32. Upon an increase in the load on the output shaft 16, the resultant reaction torque is transferred by the rollers 36 through the spider 44 and via a torque arm 74 to the rotatable ring 58. This induces a slight amount of rotation adequate to cause the rollers 64 due to the wedging action to more forcibly urge the disks 26 and 32 in engagement with the rollers 36 thereby preventing slippage. Of course, the amount of this force is, in this arrangement, determined by the load.

The tilting of the rollers 36 is accomplished through the utilization of individual torque motors 76. These torque motors 76, as will become apparent, cause the rollers 36 to be revolved about their inclination axes determined by shafts 78, as depicted in FIGURES 2 and 3, for as shown each of the rollers 36 is also revolvably mounted on the individual shafts 78 by bearings 80. Rotation of the rollers 36, as is well known, causes the rollers 36 to precess about the tilt axis or steer themselves to different tilt positions, and of course requires a substantially smaller force than if the rollers 36 were directly tilted.

The individual torque motors 76 are preferably of the variable reluctance type employing two windings 82 surrounding cores 84. The cores are separated by air gaps 86 from an armature 88. The armature 88 in turn is formed as a part of the inner race of the bearing 40. The flux path, when current flows in the windings 82, is that indicated in FIGURE 2. Of course, if the current flow through the windings is different, then one or the other of the air gaps 86 is reduced and an electromagnetic force is transferred via the armature 88 to the rollers 36 tending to cause each roller 36 to revolve about its inclination axis. As a result, the rollers 36 steer themselves to a different position determined by the interval that the force is applied to the armature. Of course, the rapidity with which the rollers 36 steer themselves to a new tilt position will be determined by the amount of the electromagnetic force.

The control system for the torque motors 76 utilizes a velocity signal generating source as a tachometer generator 90 of the kind adaptable to be driven at a speed proportional to the output shaft speed so as to develop a velocity signal voltage that will correspond to the output speed of the mechanism 10. The desired speed at which the output shaft 16 is to revolve is determined by a source of reference voltage 92 and is made adjustable so that the desired speed can be varied. The velocity signal voltage and the reference signal voltage are both supplied to a comparator 94, which may be a summing circuit that algebraically compares the two voltages and produces a differential or an error signal voltage whenever the two voltages are not equal. This error signal voltage is supplied to the input of a Class A push-pull amplifier 96. In a well known way the amplifier 96 will develop from any input error signal voltage a corresponding output for supply to the appropriate winding 82 for producing the aforementioned roller torque in the required direction.

To summarize the operation, it will be assumed for exemplary purposes that a direct drive is to be established by the mechanism 10, and also that the output shaft 16 is to be driven at a constant speed. Therefore, if the output shaft 16 commences to go slower than that desired, the velocity signal voltage produced by the tachometer generator 90 will be less than the reference signal voltage 92, and hence, the resultant error signal voltage developed by the comparator 94 will cause the torque motors 76 each to be actuated such that the rollers 36 are each inclined in a direction that will cause them to steer themselves to a tilt position towards the highest speed ratio line 52. This will cause the speed of output shaft 16 to be increased. On the other hand, if the output shaft 16 commences to travel faster than the input shaft 14, again a corresponding error signal voltage will be developed and the torque motors 76 will cause the rollers 36 to be inclined so as to steer themselves to a tilt position, which will be in the direction of line 50 or the low speed ratio line. This will slow down the output shaft 16. In other words, the torque motors 76 induce a torque into the system that causes the air gap 86 to be altered and by so doing, the rollers 36 are caused to steer themselves to the proper tilt position for achieving the desired speed control. Again, it is mentioned that the amount of this induced torque and the time interval that is applied will determine how fast a given correction is made.

From the foregoing it will be appreciated that the control system affords a way of accurately controlling the speed of a friction device and enables a constant speed to be maintained; or if it is desired to alter the speed ratio, then it is very easy to adjust the reference voltage 92. The control system as applied to the mechanism 10 negates the need for complex mechanical linkages or hydraulic controls.

The invention is to be limited only by the following claims.

I claim:

1. In a drive transfer mechanism, the combination of driving and driven members respectively provided with coaxial driving and driven surfaces, a rotatable member between the surfaces for transferring drive therebetween, and means developing an electrical force for causing the rotatable member to tiltably steer itself to certain drive ratio establishing positions.

2. In a drive transfer mechanism, the combination of coaxial driving and driven disks, a roller arranged between the disks for transferring drive therebetween, the roller being movable about both an inclination axis and a tilt axis, and electrical means urging movement of the roller about the inclination axis thereby causing the roller to urge itself about the tilt axis and to different ratio establishing positions.

3. In a drive transfer mechanism, the combination of coaxial drive and driven disks, a roller arranged between the disks for transferring drive therebetween, the roller being adjustably movable about a tilt axis to different tilt positions relative to the disks so as to alter the drive ratio of the mechanism, and electromagnetic means controlling the roller tilt position, the electromagnetic means being so constructed and arranged as to develop a torque that acts to urge the roller about another axis in a direction that causes the roller to tiltably steer itself to different tilt positions.

4. In a drive transfer mechanism, the combination of coaxial driving and driven disks, a roller disposed between the disks for transferring drive therebetween, the roller being arranged for movement about both an inclination axis and a tilt axis, the inclination and tilt axes being so aligned that movement of the roller about the inclination axis will cause the roller to steer itself about the tilt axis and to different tilt positions thereby altering the drive ratio of the mechanism, and an electromagnetic motor operative to urge the roller about the inclination axis.

5. In a drive transfer mechanism, the combination of coaxial driving and driven disks, a roller positioned between the disks for transferring drive therebetween, the roller being arranged for movement about coordinate inclination and tilt axes so that movement of the roller about the inclination axis will cause the roller to steer itself about the tilt axis to different tilt positions and thereby alter the drive ratios of the mechanism, and an electromagnetic motor arranged to have the roller as an armature so that, when the motor is operative, the roller is urged about its inclination axis thereby changing the drive ratio of the mechanism.

6. In a drive transfer mechanism, the combination of driving and driven members, said members being respectively provided with coaxial driving and driven surfaces, a rotatable member arranged to be tiltably adjusted between the surfaces for transferring drive therebetween, electrical means developing a force for causing the rotatable member to tiltably steer itself to a certain tilted drive ratio establishing position, and control means for the electrical means, the control means including means developing an error signal corresponding to variations in the speed of one of said members relative to a desired speed, the error signal causing the electrical means to vary the drive ratio so that the actual speed of one of said members approximates the desired speed.

7. In a drive transfer mechanism, the combination of coaxial drive and driven disks, a roller arranged between the disks for transferring drive therebetween, the roller being movable about both an inclination axis and a tilt axis, electrical means urging movement of the roller about the inclination axis thereby causing the roller to steer itself to different ratio establishing positions, and control means for the electrical means, the control means including means developing a velocity signal corresponding to the speed of one of the disks, a reference signal corresponding to the desired speed of the one disk, and means comparing the reference and velocity signals and developing an error signal reflecting the difference between the velocity and reference signals, the error signal rendering the electrical means operative to move the roller about the inclination axis and thereby cause the roller ratio establishing position to be altered so that the actual speed of the one disk approximates the desired speed.

8. In a drive transfer mechanism, the combination of coaxial driving and driven disks, a roller arranged between the disks for transferring drive therebetween, the roller being movable to different tilt positions relative to the disks so as to alter the drive ratio of the mechanism, electromagnetic means constructed and arranged as to develop a torque that acts to urge the roller in a direction that causes the roller to steer itself to different tilt positions, and control means for the electromagnetic means, the control means including means developing a velocity signal corresponding to the speed of one of the disks, a reference signal corresponding to a desired speed for the one disk, and means comparing the reference and velocity signals and developing an error signal reflective of the difference between the velocity and reference signals, the error signal rendering the electromagnetic means operative to change the roller tilt position and thereby cause the actual speed of the one disk to approximate the desired speed.

9. In a drive transfer mechanism, the combination of coaxial driving and driven disks, a roller arranged between the disks for transferring drive therebetween, the roller being movable about coordinate inclination and tilt axes so that the movement thereof about the inclination axis will cause the roller to steer itself about the tilt axis to different tilt positions and thereby alter the drive ratio of the mechanism, an electromagnetic motor arranged to have the roller as an armature so that when the motor is operative, the roller is urged about its inclination axis, and control means for the electromagnetic motor, the control means including a techometer generator drive connected to the driven disk so as to develop a velocity signal corresponding to the speed of the driven disk, a reference signal source developing a reference signal corresponding to the desired speed of the driven disk, and a comparator for developing an error signal corresponding to the difference between the reference and velocity signals, the comparator communicating with the electromagnetic motor so that the error signal will render the electromagnetic motor operative to urge the roller about its inclination axis and thereby cause the drive ratio of the mechanism to be altered so that the actual speed of the driven disk approximates the desired speed.

References Cited by the Examiner

UNITED STATES PATENTS

| | | | |
|---|---|---|---|
| 392,855 | 11/1888 | Coburn | 74—190.5 X |
| 414,191 | 11/1889 | Conant | 74—190.5 X |
| 754,804 | 3/1904 | Pratt | 74—200 |
| 1,296,850 | 3/1919 | Rainey | 74—210 |
| 2,111,149 | 3/1938 | Madle | 74—190.5 |
| 2,427,175 | 9/1947 | Young | 74—190.5 X |
| 2,583,790 | 1/1952 | Mikina | 74—190.5 |

FOREIGN PATENTS 824,593  11/1937  France.

BROUGHTON G. DURHAM, *Primary Examiner.*

DON A. WAITE, *Examiner.*

TEN EYCK W. SHEAR, *Assistant Examiner.*